United States Patent [19]
Burgett et al.

[11] 3,761,731
[45] Sept. 25, 1973

[54] MOTOR VEHICLE MAGNETIC GAUGE CIRCUITRY WITH TIME DELAY SWITCHING

[75] Inventors: James F. Burgett, Garden City; Lawrence J. Vanderberg, Ann Arbor, both of Mich.

[73] Assignee: Ford Motor Corporation, Dearborn, Mich.

[22] Filed: May 22, 1972

[21] Appl. No.: 255,609

[52] U.S. Cl. .............................. 307/10 R, 324/146
[51] Int. Cl. ................................................ G01r 7/00
[58] Field of Search .................... 307/10 R; 340/59, 340/60, 57; 73/4 R, 345; 324/146, 140, 106

[56] References Cited
UNITED STATES PATENTS
3,601,793  8/1971  Otto ..................................... 340/59
2,339,021  1/1944  Lingel .............................. 324/140 R Primary Examiner—Robert K. Schaefer
Assistant Examiner—M. Ginsburg
Attorney—Keith L. Zerschling et al.

[57] ABSTRACT

Motor vehicle magnetic gauge circuitry is described. The circuitry includes a source of electrical energy, a vehicle ignition switch, time delay switching means, and a magnetic gauge having a plurality of electrical coils. The circuitry may be used to indicate engine oil pressure or temperature or other physical condition. The time delay switching means provides zeroing of the magnetic gauge after the ignition switch is opened and may be used to simulate physical conditions occurring subsequent to the opening of the ignition switch. Preferably, the time delay switching means is a thermal relay.

8 Claims, 3 Drawing Figures

PATENTED SEP 25 1973 3,761,731
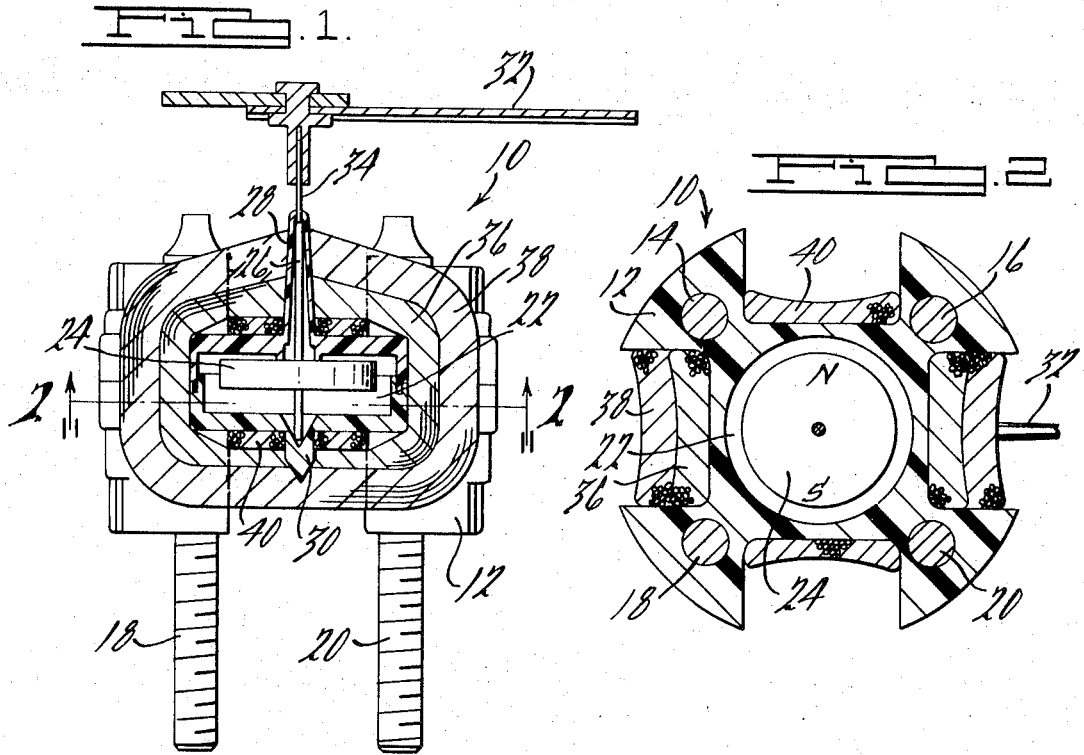
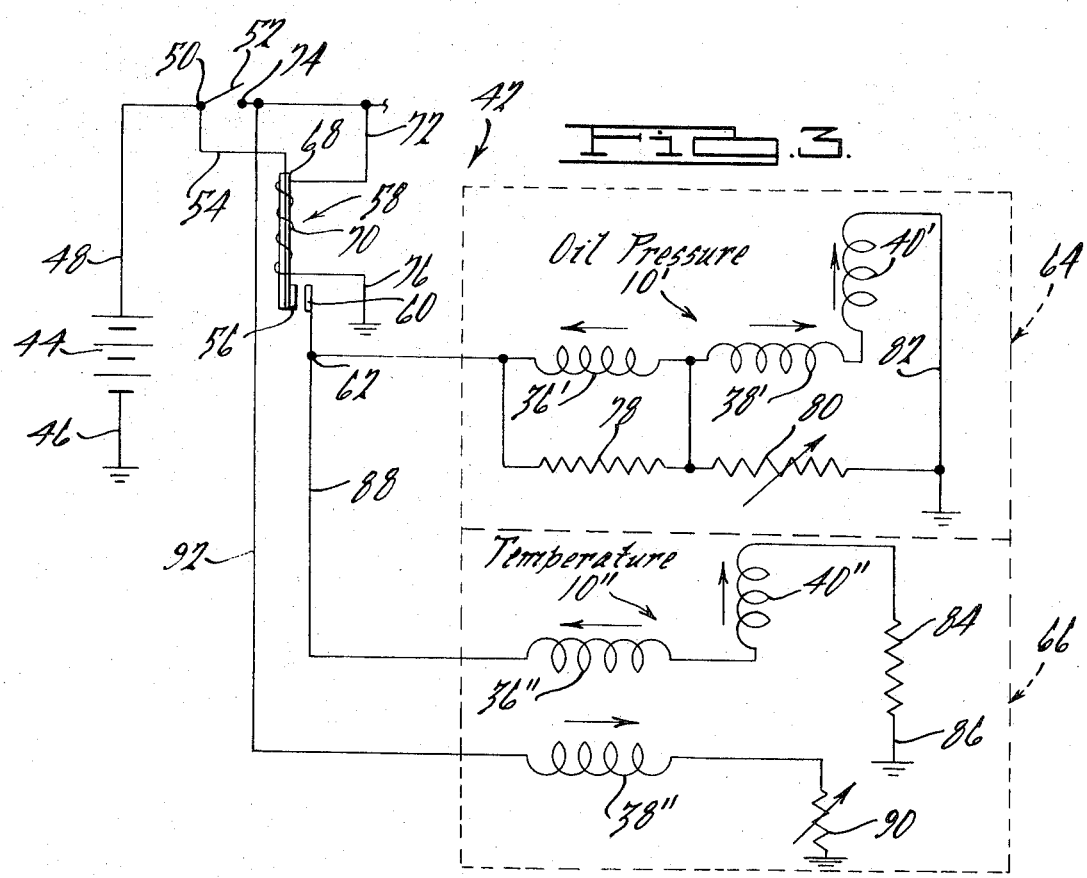

3,761,731

MOTOR VEHICLE MAGNETIC GAUGE CIRCUITRY WITH TIME DELAY SWITCHING

BACKGROUND OF THE INVENTION

This invention relates to motor vehicle magnetic gauge circuitry for indicating physical conditions in the vehicle, such as engine oil pressure or temperature. More particularly, this invention relates to motor vehicle magnetic gauge circuitry that includes an ignition switch and that further includes time delay switching means that is controlled by the change of the ignition switch from a closed condition to an open condition or vice versa.

Magnetic gauge circuits have long been used in motor vehicles for indicating engine operating conditions. The typical magnetic gauge includes a plurality of electrical coils and indicating means responsive to electrical currents in the coils. The magnetic gauge is connected to a source of electrical energy, such as the vehicle battery, through the vehicle's ignition switch. Means, such as a resistance that varies with the physical condition to be monitored, is connected to the magnetic gauge to control current levels in the gauge coils.

The typically used magnetic gauge is mechanically balanced such that disconnection of the magnetic gauge from the source of electrical energy by the opening of the ignition switch does not cause the indicating means of the gauge to return to a low or zero reading. Rather, the gauge indicating means retains for a substantial length of time the position it acquires immediately prior to the opening of the ignition switch. This is undesirable in many gauge applications. For example, if the magnetic gauge is used to indicate engine oil pressure, the opening of the ignition switch not only cuts off current to the magnetic gauge, but it also shuts off the engine of the motor vehicle. The gauge should indicate a decline in oil pressure, but this would not occur in the absence of means for restoring the gauge indicating means to a zero position.

Where a magnetic gauge is to be used to indicate the temperature of an engine in a motor vehicle, it is desirable to have the magnetic gauge indicating means return to a position that indicates low temperature when the ignition switch is opened. It is also desirable to cause the gauge to indicate its operability when the vehicle's ignition switch is initially closed.

SUMMARY OF THE INVENTION

The present invention provides motor vehicle magnetic gauge circuitry that includes time delay switching means for returning the indicating means of the magnetic gauges to zero or low indication positions subsequent to the opening of the ignition switch. The time delay switching means is controlled by the ignition switch, preferably is a thermal relay including a pair of contacts connected in series with the magnetic gauge circuit or circuits, and preferably includes time delay after both energization and de-energization of its control means.

BRIEF DESCRIPTION OF THE DRAWING

FIG. 1 is an enlarged sectional view of a magnetic gauge of a design in general use in motor vehicles;

FIG. 2 is an enlarged sectional view of the gauge of FIG. 1, the section being taken along the line 2—2 in FIG. 1; and FIG. 3 is a schematic diagram of magnetic gauge circuitry arranged in accordance with the invention.

DETAILED DESCRIPTION

Reference is made to the drawings wherein like numerals refer to like parts in the several views.

With particular reference to FIGS. 1 and 2, there are shown enlarged sectional views of a magnetic gauge having a plurality of electrical coils and having indicating means responsive to the current in the coils. The magnetic gauge, generally designated by the numeral 10, may be used to indicate various physical conditions in a motor vehicle, such as its fuel level, its engine oil pressure, or its engine temperature. The magnetic gauge 10 includes a plastic housing 12 having mounting studs 14, 16, 18, and 20. The mounting studs preferably are made from a nonmagnetic material so that they will not interfere with the operation of the magnetic gauge. Positioned within a chamber 22 in the housing 12 is a disc-shaped permanent magnet 24 having a north pole N and a south pole S. The permanent magnet 24 is attached to a shaft 26 that is journalled in bearings 28 and 30 for rotation therein. A pointer 32 is affixed to a reduced diameter extension 34 of the shaft 26. The permanent magnet 24 and the pointer 32 attached to the rotatable shaft 26 constitute the indicating means for the magnetic gauge 10.

The magnetic gauge 10 has three electrical coils 36, 38, and 40. Coils 36 and 38 are wound on the housing 12 in physical alignment with one another, but are electrically arranged such that the magnetic fields produced by them oppose or buck one another. The coil 40 is positioned at a right angle with respect to the coils 36 and 38 and its magnetic field is oriented at right angles to the fields produced by the coils 36 and 38.

The pointer 32 is shown in the position it would take were little or no current to flow through the coils 38 and 40, but with current flowing in the coil 36. Under different current level conditions in the coils 36, 38, and 40, the permanent magnet 24 and the pointer 32 rotate on the shaft 26 to a position determined by the vector resultant of the magnetic fields produced by the coils. Thus, the magnetic gauge 10 is responsive to the current levels in its plurality of coils.

With reference now in particular to FIG. 3, there is shown a schematic diagram of motor vehicle magnetic gauge circuitry arranged in accordance with the invention. The circuit, generally designated by the numeral 42, comprises a source of electrical energy, such as a storage battery 44 having one of its terminals 46 connected to ground and having its other terminal 48 connected to a first terminal or pole 50 of an ignition switch 52. The ignition switch 52 may be typical of those used in motor vehicles and may, for example, be in a closed condition when the vehicle's engine is running or its accessories are operable.

The first terminal 50 of the ignition switch 52 is connected by a lead 54 to a first electrical contact 56 of a thermal relay 58. A second electrical contact 60 of the thermal relay 58 is connected at a junction 62 to two magnetic gauge circuits which in FIG. 3 are bounded by the broken lines 64 and 66. The circuit bounded by the broken line 64 is suitable for use in the indication of engine oil pressure. The circuit bounded by the broken line 66 is suitable for indicating engine temperature.

It may be seen that the contacts 56 and 60 of the thermal relay 58 are serially interposed between the source of electrical energy 44 and the magnetic gauge circuits. The thermal relay 58 functions as a time delay means for delaying the closing of the contacts 56 and 60 after the energization of its control means and as a time delay means for delaying the opening of the contacts 56 and 60 after de-energization of its control means. For its control means, the thermal relay 58 has a bimetallic strip 68 about which is wound a coil 70 of resistance wire. The coil of resistance wire 70 is electrically connected at one of its terminals by a lead 72 to a second terminal or pole 74 of the ignition switch 52. The other terminal 76 of the coil of resistance wire 70 is connected to ground. When the ignition switch 52 is closed, current flows through the coil of resistance wire 70. This produces heat that is transferred to the bimetallic strip 68 causing it after a time delay to deflect closing the relay switch contacts 56 and 60. When the coil of resistance wire 70 ceases to conduct current by reason of the opening of the ignition switch 52, the bimetallic strip 68 begins to cool and, after a time delay, the relay switching contacts 56 and 60 open.

With particular reference now to the oil pressure portion of the magnetic gauge circuit of FIG. 3, the magnetic gauge is designated by the numeral 10' and includes electrical coils 36', 38', and 40'. The arrows positioned adjacent these coils are indicative of the directional relationship of the magnetic fields produced by these coils when current flows in them. Thus, the magnetic field produced by the coil 38' bucks or opposes the field produced by the coil 36', and the field produced by the coil 40' is directed at right angles to the magnetic fields generated by the coils 36' and 38'. A resistor 78 is connected in parallel with the coil 36' and determines the amount of current that flows through it. The resistor 78 is not essential to operation of the oil pressure magnetic gauge, but it is desirable in that it can be used for gauge calibration and limits the current through the coil 36' while simultaneously reducing the voltage drop across it. A typical value for the resistor 78 is 90 ohms.

A variable resistance 80 is connected in parallel with the series-connected magnetic gauge coils 38' and 40'. Typically, this resistance 80 may vary from 0 to 90 ohms in response to changes in engine oil pressure. Thus, at low or zero oil pressure, the resistance 80 would be 0 ohms, and at high oil pressure, the resistance 80 would be 90 ohms. A lead 82 connects the variable resistance 80 and the gauge coil 40' to ground.

With reference now to the engine temperature portion of the magnetic gauge circuitry, the magnetic gauge for temperature indication is designated by the numeral 10'' and includes gauge coils 36'', 38'', and 40''. A resistor 84 is connected in series with the gauge coil 36'' and 40'' and is connected to ground at 86. The resistor 84 calibrates the gauge and limits the current through the coils 36'' and 40''. The coil 36'' is connected by a lead 88 to the contact 60 of the thermal relay 58. Thus, the relay switch contacts 56 and 60 are interposed between the source of electrical energy 44 and the temperature magnetic gauge coils 36'' and 40''. A variable resistance 90 is connected at one of its terminals to the gauge coil 38'' and at its other terminal to ground. The variable resistance 90 preferably is a negative temperature coefficient thermistor and varies in resistance with engine temperature. The thermistor may, for example, have a resistance of 73 ohms at low or ambient temperature conditions and may have a resistance of 10 ohms when the engine is at an undesirably high operating temperature. Thus, the variable resistance 90 controls the current flow through the gauge coil 38''. The coil 38'' is connected by a lead 92 to the second terminal 74 of the ignition switch 52.

The operation of the magnetic gauge circuitry of FIG. 3 will now be described. In connection with this description, it will be assumed that the ignition switch 52 is closed at a time when the motor vehicle in which the magnetic gauge circuitry is installed has been standing for some time so that its oil pressure is zero or very low and its temperature is at ambient condition. At this time, the relay switch contacts 56 and 60 of the thermal relay 58 are open and no current flows to the junction 62. However, the closure of the ignition switch 52 causes current to flow through the coil of resistance wire 70 to ground. This generates heat which is transferred to the bimetallic strip 68 causing it to bend and causing the contacts 56 and 60 to close. Of course, after the resistance wire coil 70 is energized by the closure of the ignition switch 52, there is a predetermined time delay before the relay switch contacts 56 and 60 close. The closure of these switch contacts causes current to flow through the oil pressure magnetic gauge 10'. Thus, current flows from the junction 62 to the gauge coil 36' and through the resistance 78 in parallel with it. If the vehicle's engine oil pressure is low, most of this current will flow through the variable resistance 80 as well, but as oil pressure builds up more and more current flows through the gauge coils 38' and 40'. The indicating means of the oil pressure gauge rotates to indicate higher oil pressure.

The operation of the engine temperature gauge 10'' will now be examined. When the ignition switch 52 is initially closed, the relay switch contacts 56 and 60 are open and no current can flow through the gauge coils 36'' and 40''. However, current does flow immediately through the ignition switch 52, the line 92, and the gauge coil 38'' connected in series with the negative temperature coefficient variable resistance 90. This causes the indicating means of the temperature gauge 10'' to move toward a full scale position. After a predetermined time delay, the relay switch contacts 56 and 60 close as described in the preceding paragraph. When this occurs, current flows from the junction 62 through the lead 88, through the gauge coils 36'' and 40'', and through the resistance 84 to ground. This causes the temperature gauge to indicate a low engine temperature, it being assumed that the engine is initially cold and the variable resistance 90 is high. As the engine temperature increases, the variable resistance 90 decreases allowing more current to flow through the gauge coil 38'' producing a magnetic field of increasing intensity that is in opposition to the magnetic field produced by the current flowing through the gauge coil 36''. Thus, the temperature gauge immediately goes to a near full scale position upon the closure of the ignition switch 52, which indicates the operability of the gauge, and subsequently moves downward on the gauge scale following the closure of the relay switch contacts 56 and 60.

Let it now be assumed that the vehicle's engine has been operating for some time so that its oil pressure is high and its temperature is within the normal operating range. If the ignition switch 52 is then opened, turning off the vehicle's engine, the oil pressure decreases and this is sensed by the variable resistance 80. The oil pressure gauge continues to indicate this decrease in oil pressure for a predetermined time because the relay switch contacts 56 and 60 do not open until a predetermined time has elapsed. This time delay is due to the de-energization of the resistance wire 70 caused by the opening of the ignition switch 52. During the time delay, the bimetallic strip 68 cools and eventually opens the relay switch contacts. Thus, the indicating means of the oil pressure gauge returns to zero or a low pressure indication. If the opening of the relay switch contacts 56 and 60 were not delayed subsequent to the opening of the ignition switch 52, then the indicating means of the oil pressure gauge would retain its oil pressure indication as of the instant the ignition switch is opened. This would be an obvious false indication of oil pressure when the vehicle's engine is not being operated.

With respect to the engine temperature gauge 10'', the opening of the ignition switch 52 causes an immediate cessation of current flow through the gauge coil 38''. However, the current through the temperature gauge coils 36'' and 40'' continues to flow for a predetermined time delay resulting from the delay in the opening of the relay switch contacts 56 and 60. The cessation of current flow through the gauge coil 38'' causes the temperature gauge reading to decline toward a low indication, an indication which is retained when the switch contacts 56 and 60 open.

Based upon the foregoing description of the invention, what is claimed and desired to be protected by Letters Patent is:

1. Magnetic gauge circuitry for a motor vehicle having an ignition switch, said ignition switch having open and closed conditions, which comprises:
   a source of electrical energy;
   a magnetic gauge having a plurality of electrical coils and having indicating means responsive to electrical current in said coils;
   a switching device interposed between said source of electrical energy and at least one of said magnetic gauge coils to control current flow from said source of electrical energy to said at least one of said magnetic gauge coils, said switching device having open and closed conditions; and
   means for delaying for a predetermined time the change of said switching device from its closed condition to its open condition following the change of said ignition switch from its closed condition to its open condition.

2. Magnetic gauge circuitry in accordance with claim 1, wherein said means further includes the function of delaying for a predetermined time the change of said switching device from its open condition to its closed condition following the change of said ignition switch from its open condition to its closed condition.

3. Magnetic gauge circuitry in accordance with claim 1, wherein said switching device and said delaying means comprises a time delay relay.

4. Magnetic gauge circuitry in accordance with claim 2, wherein said switching device, said means for delaying for a predetermined time the change of said switching device from its closed condition to its open condition, and for delaying for a predetermined time the change of said switching device from its open condition to its closed condition comprises a thermal relay.

5. Magnetic gauge circuitry for a motor vehicle having an ignition switch, which comprises:
   a source of electrical energy;
   a magnetic gauge having a plurality of electrical coils and having indicating means responsive to electrical current in said coils;
   a pair of switch contacts connected in series with at least one of said gauge electrical coils; and
   means coupled to said ignition switch for opening, after a time delay, said pair of switch contacts in response to the opening of said ignition switch and for closing, after a time delay, said pair of switch contacts in response to the closing of said ignition switch.

6. Magnetic gauge circuitry in accordance with claim 5, wherein said means for opening and closing said pair of switch contacts comprises a relay, said relay having both time delay after energization and time delay after de-energization.

7. Magnetic gauge circuitry in accordance with claim 6, wherein said relay is a thermal relay.

8. Magnetic gauge circuitry for indicating the temperature of the engine of a motor vehicle, said circuitry comprising: a source of electrical energy; an ignition switch connected to said source of electrical energy; a magnetic gauge having a plurality of electrical coils and having indicating means responsive to electrical current in said coils; and means for supplying electrical current to less than all of said gauge coils immediately upon closure of said ignition switch and, after a time delay, for supplying current to all of said coils, thereby, to indicate the operability of said gauge and the temperature of said engine.

* * * * *